(12) United States Patent
Muramatsu et al.

(10) Patent No.: US 9,231,508 B2
(45) Date of Patent: Jan. 5, 2016

(54) MOTOR DRIVER APPARATUS AND METHOD OF CONTROLLING THE SAME

(71) Applicants: Atsushi Muramatsu, Tokyo (JP); Tomomitsu Ohara, Tokyo (JP)

(72) Inventors: Atsushi Muramatsu, Tokyo (JP); Tomomitsu Ohara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 152 days.

(21) Appl. No.: 14/246,191

(22) Filed: Apr. 7, 2014

(65) Prior Publication Data

US 2014/0306639 A1    Oct. 16, 2014

(30) Foreign Application Priority Data

Apr. 16, 2013 (JP) .................. 2013-085811

(51) Int. Cl.
*H02P 1/00* (2006.01)
*H02P 1/28* (2006.01)
*H02P 3/00* (2006.01)
*H02P 7/28* (2006.01)
*H02P 7/00* (2006.01)
*H02P 31/00* (2006.01)

(52) U.S. Cl.
CPC ............... *H02P 7/28* (2013.01); *H02P 7/0044* (2013.01); *H02P 31/00* (2013.01)

(58) Field of Classification Search
CPC ..................................................... H02P 31/00

USPC .......................................................... 318/504
See application file for complete search history.

(56) References Cited

U.S. PATENT DOCUMENTS

| | | | | |
|---|---|---|---|---|
| 5,557,182 A * | 9/1996 | Hollenbeck | ............. | F23N 1/062 318/400.13 |
| 6,949,900 B1* | 9/2005 | Berringer | ................. | H02P 6/08 318/400.03 |
| 2006/0186846 A1* | 8/2006 | Lassen | .................... | H02P 6/182 318/400.21 |
| 2007/0069675 A1* | 3/2007 | MacKay | ................. | H02P 6/182 318/400.21 |
| 2007/0164691 A1* | 7/2007 | MacKay | ................. | H02P 6/182 318/1 |

FOREIGN PATENT DOCUMENTS

JP        2009-278734        11/2009

* cited by examiner

*Primary Examiner* — Erick Glass
(74) *Attorney, Agent, or Firm* — IPUSA, PLLC

(57) ABSTRACT

A motor driver apparatus that is formed of a semiconductor integrated circuit which is supplied with an electric power and drives a direct current motor includes a signal generating part that generates an indication signal for indicating a back electromotive force generation period while the direct current motor generates a back electromotive force, a removing part that detects a voltage variation generated in a power-supply voltage by the back electromotive force generated by the direct-current motor during the back electromotive force generation period indicated by the indication signal, and removes the detected voltage variation, and a limiting part that limits the power-supply voltage so as to be less than a predetermined voltage at a speed higher than that in the removing part.

8 Claims, 6 Drawing Sheets

MOTOR DRIVER APPARATUS AND METHOD OF CONTROLLING THE SAME

CROSS-REFERENCE TO RELATED APPLICATIONS

This patent application is based upon and claims the benefit of priority of Japanese Patent Application No. 2013-085811, filed on Apr. 16, 2013, the entire contents of which are incorporated herein by reference.

BACKGROUND OF THE INVENTION

1. Field of the Invention

The present invention relates to a motor driver apparatus and a method of controlling the motor driver apparatus.

2. Description of the Related Art

FIG. 6 illustrates a structure of an exemplary motor driver apparatus. Referring to FIG. 6, a motor driver apparatus 10 is attached to and is used for an electric instrument 11. A direct-current power source 12 and an integrated circuit (IC) 13 are provided inside the electric instrument 11. The terminals 14 and 15 are connected with a positive terminal of the direct-current power source 12 and a negative terminal of the direct-current power source 12, respectively.

The motor driver apparatus 10 includes a motor driver IC 20. The terminals 14 and 15 are connected with a power terminal having VDD of the motor driver IC 20 and a ground terminal having GND of the motor driver IC 20. The motor driver IC 20 causes an electric current to flow through a winding wire of a motor 23 whose both terminals are connected with the terminals 21 and 22 through n-channel MOS transistors M1 to M4 thereby driving to rotate the direct current motor 23.

A first state where the MOS transistors M1 and M4 are turned on and the MOS transistors M2 and M3 are turned off to cause a current to flow through the direct-current motor 23 in a direction from the terminal 21 to the terminal 22 and a second state where the MOS transistors M2 and M3 are turned on and the MOS transistors M1 and M4 are turned off to cause the current to flow through the direct-current motor 23 in a direction from the terminal 22 to the terminal 21 are alternately switched over to rotate the direct-current motor. In order to obtain the above-described switch timing, a detection element (not illustrated) having a rotational phase such as a hall element is used.

For example, an exemplary motor driving apparatus is proposed in Japanese Laid-open Patent Application No. 2009-278734.

SUMMARY OF THE INVENTION

In the circuit illustrated in FIG. 6, the inductor of the winding wire of the direct-current motor 23 generates a back electromotive force at a timing when the first state where the MOS transistors M1 and M4 are turned on and the MOS transistors M2 and M3 are turned off to cause the current to flow through the direct-current motor 23 in the direction from the terminal 21 to the terminal 22 is switched over from the second state where the MOS transistors M2 and M3 are turned on and the MOS transistors M1 and M4 are turned off to cause the current to flow through the direct-current motor 23 in the direction from the terminal 22 to the terminal 21. A current to the power terminal having VDD caused by the back electromotive force is prevented from flowing by a diode D1 for a protection against reverse connection, the voltage VDD of the power terminal of the motor driver IC 20 increases to possibly exceed a withstand voltage by an increment of the voltage VDD of the power terminal of the motor driver IC 20. A zener diode is added to prevent the voltage VDD of the power terminal from exceeding the withstand voltage. A decoupling capacitor C2 having a capacity greater than that of an ordinary bypass capacitor C1 is added to delay a voltage increment of the power terminal having VDD. Therefore, there is a problem that the number of parts externally attached to the motor driver IC 20 becomes great.

The embodiment of the present invention provides a motor driver apparatus where the number of parts externally attached to a semiconductor integrated circuit is reduced and a method of controlling the motor drive apparatus in consideration of the above.

According to a motor driver apparatus of embodiments of the present invention, the motor driver apparatus is formed of a semiconductor integrated circuit which is supplied with an electric power and drives a direct current motor (23) and includes a signal generating part (43-48, Ct) that generates an indication signal for indicating a back electromotive force generation period while the direct current motor generates a back electromotive force, a removing part (41, 42, Cr, M5) that detects a voltage variation generated in a power-supply voltage by the back electromotive force generated by the direct-current motor during the back electromotive force generation period indicated by the indication signal, and removes the detected voltage variation, and a limiting part (51, M5) that limits the power-supply voltage so as to be less than a predetermined voltage at a speed higher than that in the removing part.

Preferably, the removing part (41, 42, Cr, M5) detects the voltage variation generated by performing a differential amplification between the power-supply voltage held in a period other than the back electromotive force generation period indicated by the indication signal and the power-supply voltage in the back electromotive force generation period indicated by the indication signal, and the limiting part (51, M5) limits the power-supply voltage in response to a comparative result obtained by comparing the power-supply voltage with the predetermined voltage.

Preferably, the limiting part limits the power-supply voltage in response to the comparative result obtained by comparing the power-supply voltage in the back electromotive force generation period indicated by the indication signal with the predetermined voltage.

Preferably, the removing part (41, 42, Cr, M5) detects the voltage variation generated in the power-supply voltage by performing a differential amplification between the power-supply voltage held in a period other than the back electromotive force generation period indicated by the indication signal and the power-supply voltage in the back electromotive force generation period indicated by the indication signal, and the limiting part (52, 53, Cr2, M5) limits the power-supply voltage in response to a comparative result obtained by comparing the power-supply voltage held in the period other than the back electromotive force generation period indicated by the indication signal with the power-supply voltage in the back electromotive force generation period indicated by the indication signal.

According to a method of controlling a motor driver apparatus, the apparatus is formed of a semiconductor integrated circuit which is supplied with an electric power and drives a direct current motor, and the method includes generating an indication signal for indicating a back electromotive force generation period while the direct current motor generates a back electromotive force, detecting a voltage variation generated in a power-supply voltage by the back electromotive force generated by the direct-current motor during the back electromotive force generation period indicated by the indication signal, removing the detected voltage variation, and limiting the power-supply voltage so as to be less than a predetermined voltage at a speed higher than that in the removing the detected voltage variation.

Preferably, the detecting the voltage variation includes performing a differential amplification between the power-supply voltage held in a period other than the back electromotive force generation period indicated by the indication signal and the power-supply voltage in the back electromotive force generation period indicated by the indication signal, and the limiting the power-supply voltage is performed in response to a comparative result obtained by comparing the power-supply voltage with the predetermined voltage.

Preferably, the limiting the power-supply voltage is performed in response to the comparative result obtained by comparing the power-supply voltage in the back electromotive force generation period indicated by the indication signal with the predetermined voltage.

Preferably, the detecting the voltage variation includes performing a differential amplification between the power-supply voltage held in a period other than the back electromotive force generation period indicated by the indication signal and the power-supply voltage in the back electromotive force generation period indicated by the indication signal, and the limiting the power-supply voltage is performed in response to a comparative result obtained by comparing the power-supply voltage held in the period other than the back electromotive force generation period indicated by the indication signal with the power-supply voltage in the back electromotive force generation period indicated by the indication signal.

The reference symbols in the above parentheses are attached for easy understanding and are provided as an example. The present invention is not limited to a mode illustrated in the figures.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF EMBODIMENTS

A description is given below, with reference to the FIG. 1 through FIG. 6 of embodiments of the present invention.

Reference symbols typically designate as follows:
12: direct-current power source;
21, 22: terminal;
23: direct-current motor;
30: motor driver apparatus;
40: first control part;
42, 53: analog switch;
44, 45, 46, 47: inverter;
48: current source;
50: second control part;
51, 52: comparator;
Cr, Ct: capacitor;
Di1, Di2, Di3, Di4: diode;
M1, M2, M3, M4, M5: MOS transistor; and
R1, R2, R3, R4, R5: resistor.

First Embodiment

Figure 1:
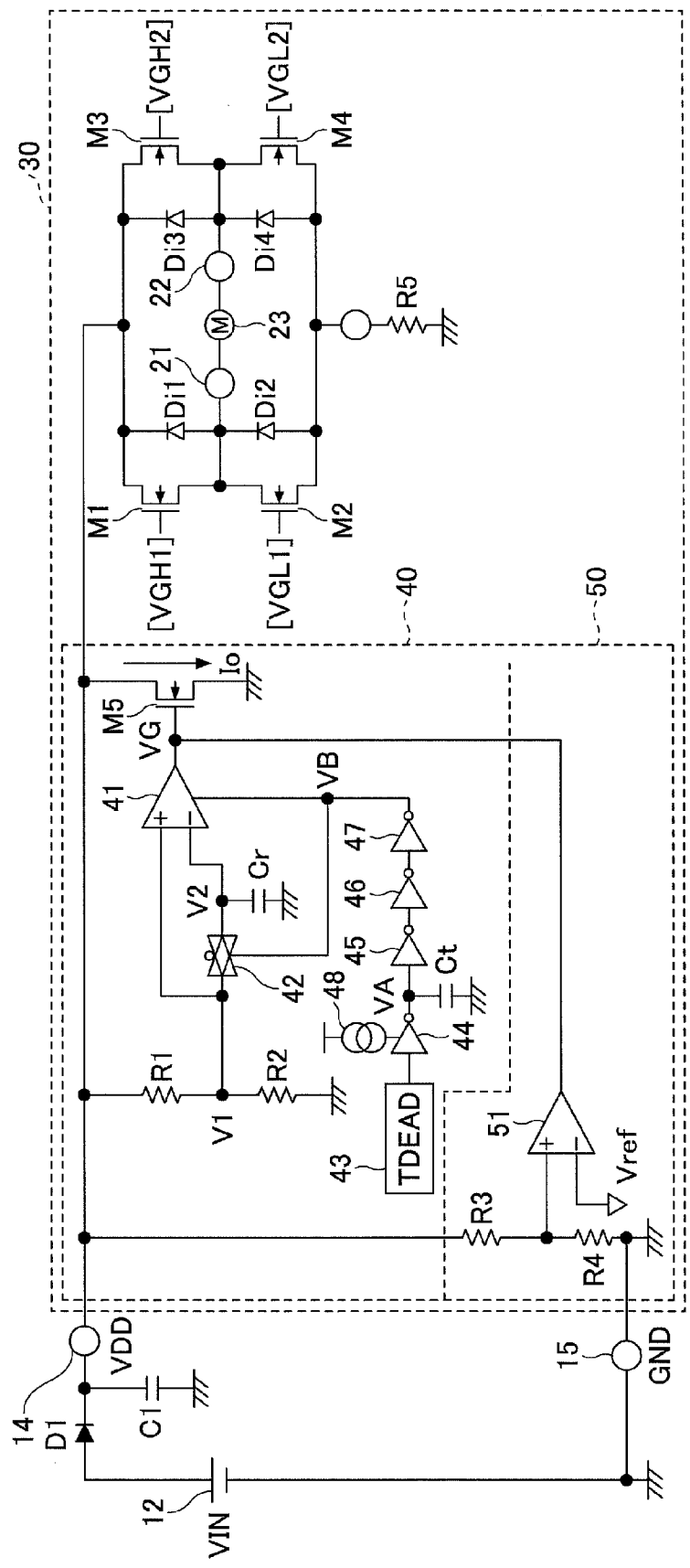
FIG. 1 illustrates a structure of a motor driver apparatus of a first embodiment of the present invention.
Figure 6:
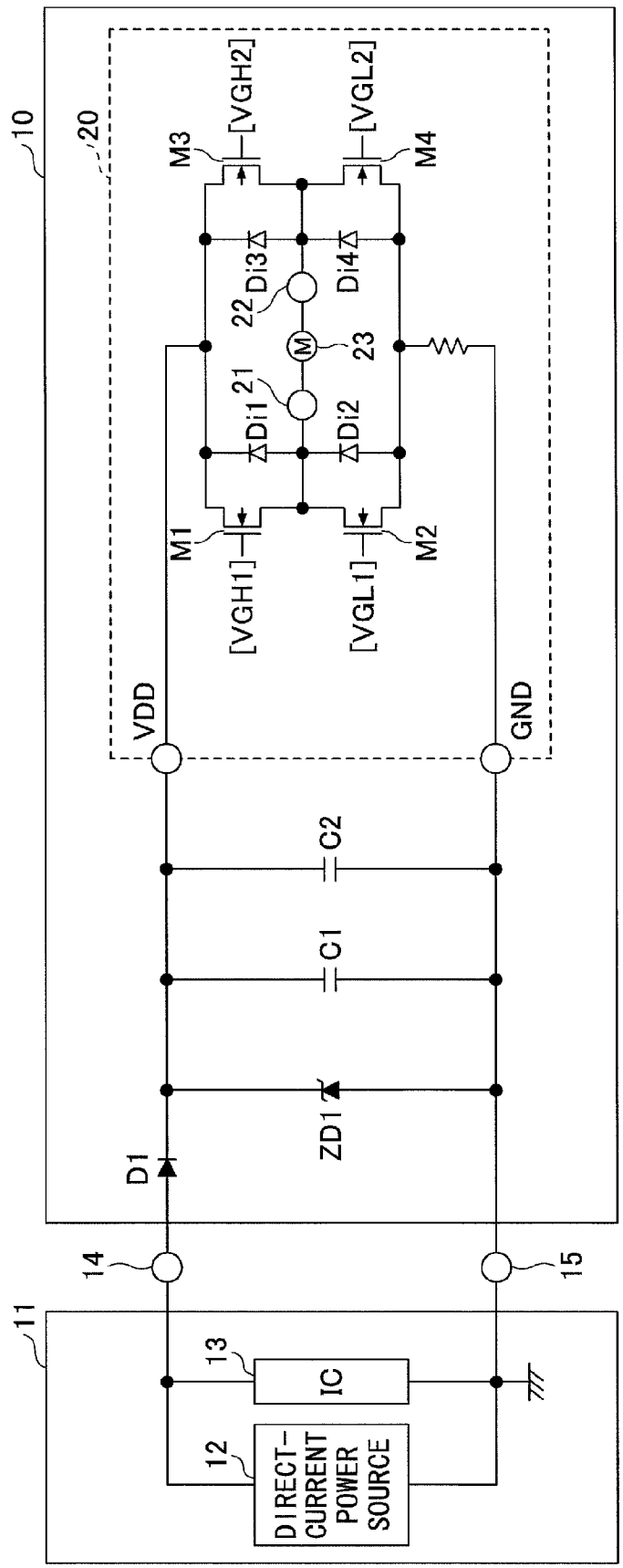
FIG. 6 illustrates an exemplary structure of a motor driver apparatus.

FIG. 1 illustrates a structure of a motor driver apparatus of a first embodiment of the present invention. Referring to FIG. 1, the same reference symbols as those in FIG. 6 are attached to the same parts. A motor driver apparatus 30 is formed of a semiconductor integrated circuit in its entirety except for a direct-current motor 23. The motor driver apparatus 30 itself is a motor driver IC. The motor driver apparatus 30 is mounted on an electric instrument (not illustrated) when it is used. The positive terminal of the direct-current power source 12 inside the electric instrument is connected with the terminal 14 through a diode for protecting against a reverse connection, and the negative terminal of the direct-current power source 12 inside the electric instrument is connected with the terminal 15. Further, the terminal 14 is grounded through a bypass capacitor C1 for absorbing a voltage variation.

A power terminal having VDD and a ground terminal having GND of the motor driver apparatus 30 are connected with the terminals 14 and 15, respectively. The motor driver apparatus 30 causes an electric current to flow through the winding wire of the direct-current motor 23 whose both terminals are connected with the terminals 21 and 22 through n-channel MOS transistors M1 to M4 thereby driving to rotate the direct current motor 23.

The first state where the MOS transistors M1 and M4 are turned on and the MOS transistors M2 and M3 are turned off to cause a current to flow through the direct-current motor 23 in a direction from the terminal 21 to the terminal 22 and the second state where the MOS transistors M2 and M3 are turned on and the MOS transistors M1 and M4 are turned off to cause the current to flow through the direct-current motor 23 in a direction from the terminal 22 to the terminal 21 are alternately switched over to rotate the direct-current motor 23.

In order to obtain the above-described switch timing, a detection element (not illustrated) having a rotational phase such as a hall element is used. Drive signals VGH1 and VGL2 supplied to the gates of MOS transistors M1 and M4 and drive signals VGL1 and VGH2 supplied to the gates of MOS transistors M2 and M3 are generated using a detection signal from the detection element. A back gate of each of the MOS transistors M1, M2, M3, and M4 is connected with a source of each of the MOS transistors M1, M2, M3, and M4. Body diodes (parasitic diodes) Di1, Di2, Di3, and Di4 are formed between the sources and the drains, through which currents generated by a back electromotive force are supplied to the power terminal having VDD. Drains of the MOS transistors M1 and M3 are connected with the power terminal having VDD (the terminal 14), and sources of the MOS transistors M2 and M4 are connected with the ground directly or through a resistor R5.

(First Control Part)

The motor driver apparatus 30 includes a first control part 40 and a second control part 50 in addition to the MOS transistors M1 to M4 in a bridge structure. The first control part 40 includes resistors R1 and R2 that are connected between the power terminal having VDD and the ground in series, a differential amplifier 41 whose noninverted input terminal is connected with the connection point between the resistors R1 and R2, an analog switch 42 connected between the connection point between the resistors R1 and R2 and an inverted input terminal of the differential amplifier 41, a capacitor Cr provided between the inverted input terminal of the differential amplifier 41 and the ground, four-stage inverters 44-47 supplied with a signal TDEAD from a terminal 43 and delaying the signal, a waveform shaping part formed by the inverters 44-47, a current source 48 and a capacitor Ct, and a MOS transistor M5.

Figure 2:
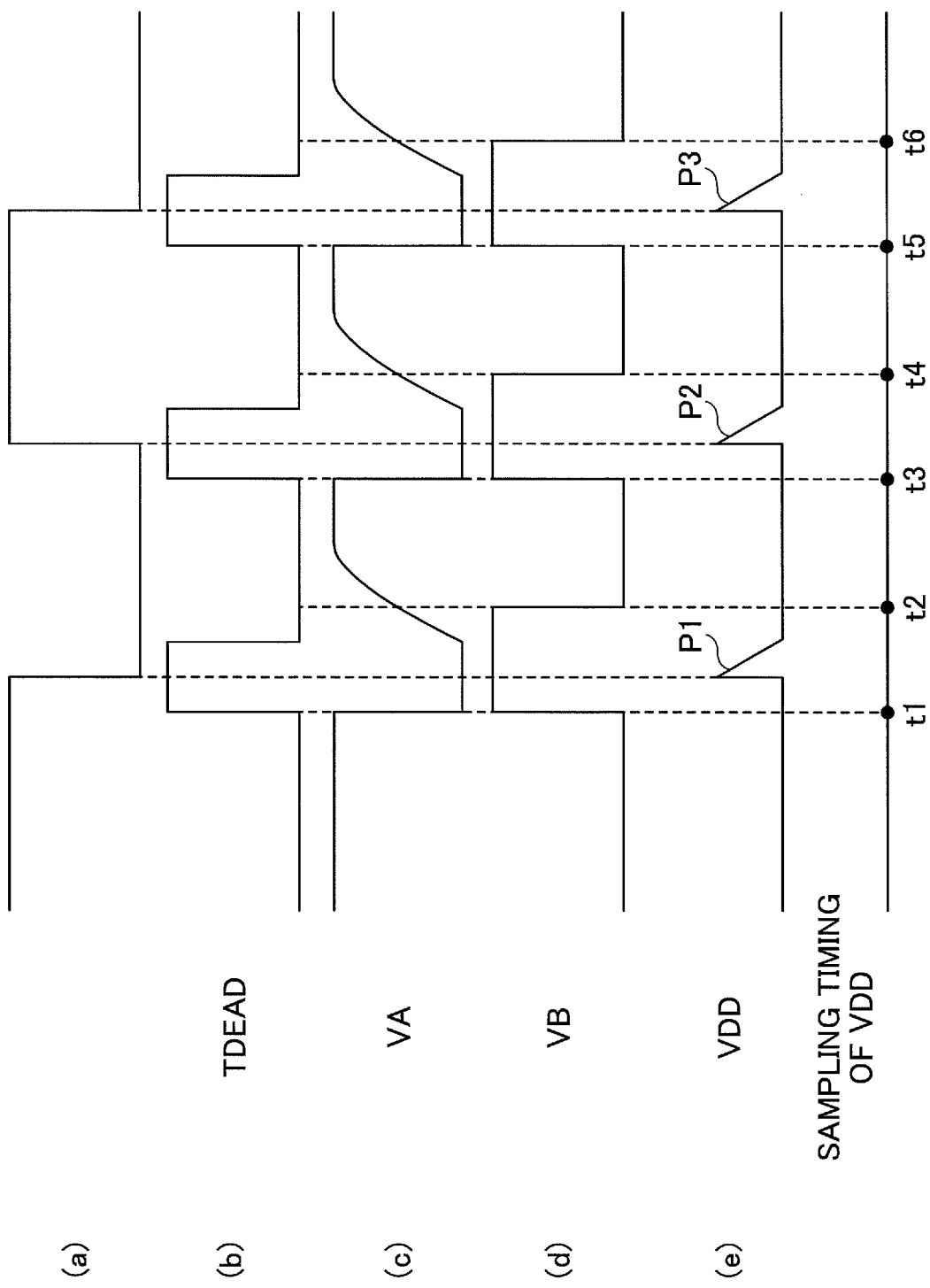
FIG. 2 illustrates signal waveforms in a part of a motor driver apparatus.

For example, in a case where a motor phase switch signal is rectangular as illustrated in (a) of FIG. 2, the signal TDEAD is in a high level during a period including a rise and a fall of the motor phase switch signal as illustrated in (b) of FIG. 2. The signal TDEAD is generated from the detection signal of the detection element such as the hall element and an ordinary signal used to prevent the drive signals VGH1 and VGL2 and the drive signals VGL1 and VGH2 from being simultaneously in the high level. The reason why the drive signals VGL1 and VGH2 are prevented from being in the high level is to prevent a penetration current from flowing through a route of the MOS transistors M1 and M2 and a route of the MOS transistors M3 and M4.

The current source 48 and the capacitor Ct delays the rise of the output of the inverter 44 to make the output waveform from the inverter 44 as illustrated in (c) of FIG. 2 in response to the signal TDEAD illustrated in (b) of FIG. 2. With this, in the output waveform from the inverter 47 illustrated in (d) of FIG. 2, a back electromotive force generation period while a back electromotive force is generated by the direct-current motor 23 is indicated as the high level. The output waveform of the inverter 47 is supplied to the control terminals of the differential amplifier 41 and a analog switch 42.

The analog switch 42 is turned on when the output signal from the inverter 47 is in the low level to make the capacitor Cr hold a divided voltage obtained by dividing the voltage VDD of the power terminal using the resistors R1 and R2. The analog switch is turned off when the output signal from the inverter 47 is in the high level to apply the divided voltage held in the capacitor Cr to an inverted input terminal of the differential amplifier 41.

The differential amplifier 41 performs differential amplification when the output signal from the inverter 47 is in the high level. At the time when the motor phase switch signal rises and falls illustrated in (a) of FIG. 2, the inductor of the wiring wire of the direct-current motor 23 generates the back electromotive force. Therefore, in the voltage VDD of the power terminal, variations P1, P2, and P3 are generated by the back electromotive force as illustrated in (e) of FIG. 2.

During a period up to t1, a period between t2 and t3, a period between t4 and t5, a period from t6, while the output waveform from the inverter illustrated in (d) of FIG. 2 shows the low level, the divided voltage obtained at the power terminal having VDD is held by the capacitor Cr. The differential amplifier 41 is operated while the output waveform from the inverter 47 is in the high level, namely, the period t1 to t2, the period t3-t4, and the period t5-t6, when the differential amplifier 41 outputs a voltage waveform similar to the variations P1, P2, and P3 illustrated in (e) of FIG. 2. The output from the differential amplifier 41 is supplied to the gate of the re-channel MOS transistor M5. The source of the MOS transistor M5 is grounded, and the drain is connected to the power terminal having VDD. With this, the MOS transistor M5 absorbs the above variations P1, P2, and P3 illustrated in (E) OF FIG. 2 by causing a source current Io corresponding to the variations P1, P2, and P3 to flow. Thus, the voltage VDD of the power terminal is flattened.

(Second Control Part)

The second control part 50 includes resistors R3 and R4 connected in series between the power terminal having VDD and the ground and a comparator 51 whose noninverted input terminal is connected with the connection point between the resistors R3 and R4. A reference voltage Vref is supplied to the inverted input terminal of the comparator 51. The reference voltage Vref is higher than a voltage obtained by dividing the voltage of the direct-current power source 12 by the resistors R3 and R4 and is slightly lower than a voltage obtained by dividing the withstand voltage of the semiconductor integrated circuit of the motor driver apparatus 30 using the resistors R3 and R4.

The comparator 51 generates the detection signal of the high level in a time period while the divided voltage VDD of the power terminal exceeds the reference voltage Vref and supplies the detection signal of the high level to the gate of the MOS transistor M5. The MOS transistor M5 is turned on during the time period when the detections signal is supplied from the comparator 51 to limit the voltage VDD of the power terminal to be a predetermined voltage less than the withstand voltage of the semiconductor integrated circuit.

Because the comparator 51 has a very great gain in comparison with the differential amplifier 41, the comparator 51 performs a high speed operation whose speed is higher than the speed of the differential amplifier. Therefore, in a case where the peak value of the variation P1 or the like becomes so high that the differential amplifier 41 cannot follow the peak value of the variation P1 or the like and the variation P1 or the like cannot be absorbed, it becomes possible to limit the voltage VDD of the power terminal to be less than the withstand voltage of the semiconductor integrated circuit by turning on the MOS transistor M5. In this, the MOS transistor M5 is turned on by the high speed operation performed by the comparator 51 performs in a case where the divided voltage VDD of the power terminal exceeds the reference voltage Vref.

(Case where Peak Value of Variation is Low)

Figure 3:
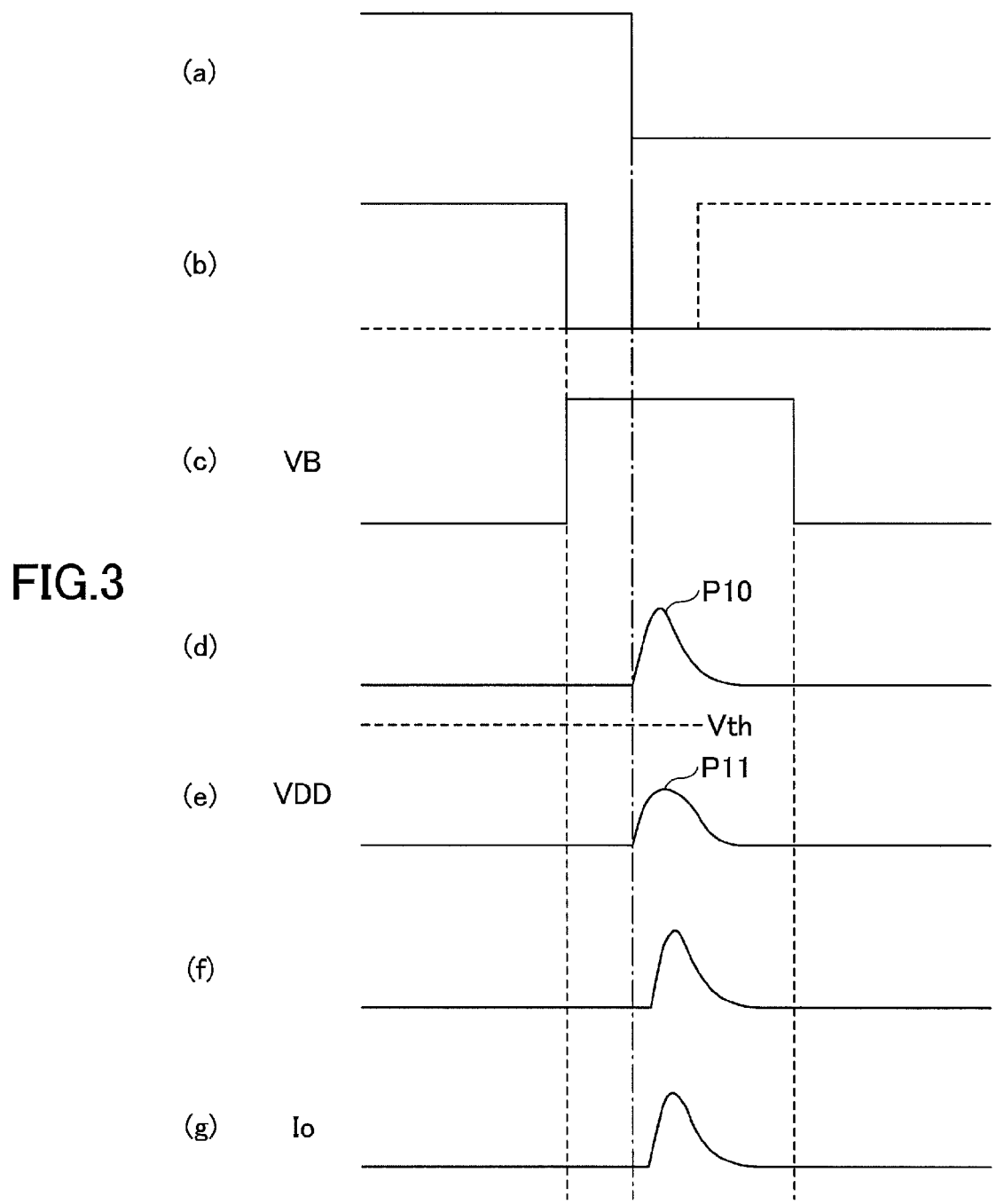
FIG. 3 illustrates signal waveforms in another part of the motor driver apparatus.

FIGS. 3A to 3G illustrates a signal waveform of various portions of the motor driver apparatus in a case where the peak value of the variation is low as illustrated in FIG. 3. The voltage VB output from the inverter 47 becomes a waveform as illustrated in (C) OF FIG. 3 with respect to the motor phase switch signal illustrated in (A) OF FIG. 3 and the drive signals VGH1 and VGL2 indicated by a solid line and the drive signals VGL1 and VGH2 indicated by a dash line in (B) OF FIG. 3. Further, the current caused by the back electromotive force that is generated by the inductor of the winding wire of the direct-current motor 23 has a waveform illustrated in (D) OF FIG. 3. Here, the peak value of the current 210 caused by the back electromotive force is low, and the peak value of the variation P11 in the voltage VDD of the power terminal illustrated in (E) OF FIG. 3 is less than the withstand voltage Vth of the semiconductor integrated circuit.

By the variation P11 in (E) OF FIG. 3, the output voltage of the differential amplifier 41 is as illustrated in (F) OF FIG. 3. Therefore, the MOS transistor M5 causes the source current Io to flow having the waveform illustrated in (G) OF FIG. 3 to flatten the voltage VDD of the power terminal.

(Case where Peak Value of Variation is High)

FIGS. 4A to 4I illustrates a signal waveform of various portions of the motor driver apparatus in a case where the peak value of the variation is low as illustrated in FIG. 3. The voltage VB output from the inverter 47 becomes a waveform as illustrated in (C) OF FIG. 4 with respect to the motor phase switch signal illustrated in (A) OF FIG. 4 and the drive signals VGH1 and VGL2 indicated by a solid line and the drive signals VGL1 and VGH2 indicated by a dash line in FIG. 4B. Further, a current P20 caused by the back electromotive force that is generated by the inductor of the winding wire of the direct-current motor 23 has a waveform illustrated in (D) OF FIG. 4. Here, the peak value of the current P20 caused by the back electromotive force is high, and the peak value of the variation in the voltage VDD of the power terminal illustrated in (E) OF FIG. 4 exceeds the withstand voltage Vth of the semiconductor integrated circuit. However, before the peak value of the variation exceeds the withstand voltage Vth of the semiconductor integrated circuit, the detection signal of the high level illustrated in (G) OF FIG. 4 is output from the comparator 51. Therefore, the MOS transistor M5 is turned on, and the voltage VDD of the power terminal is limited to be less than the withstand voltage Vt of the semiconductor integrated circuit.

Figure 4:
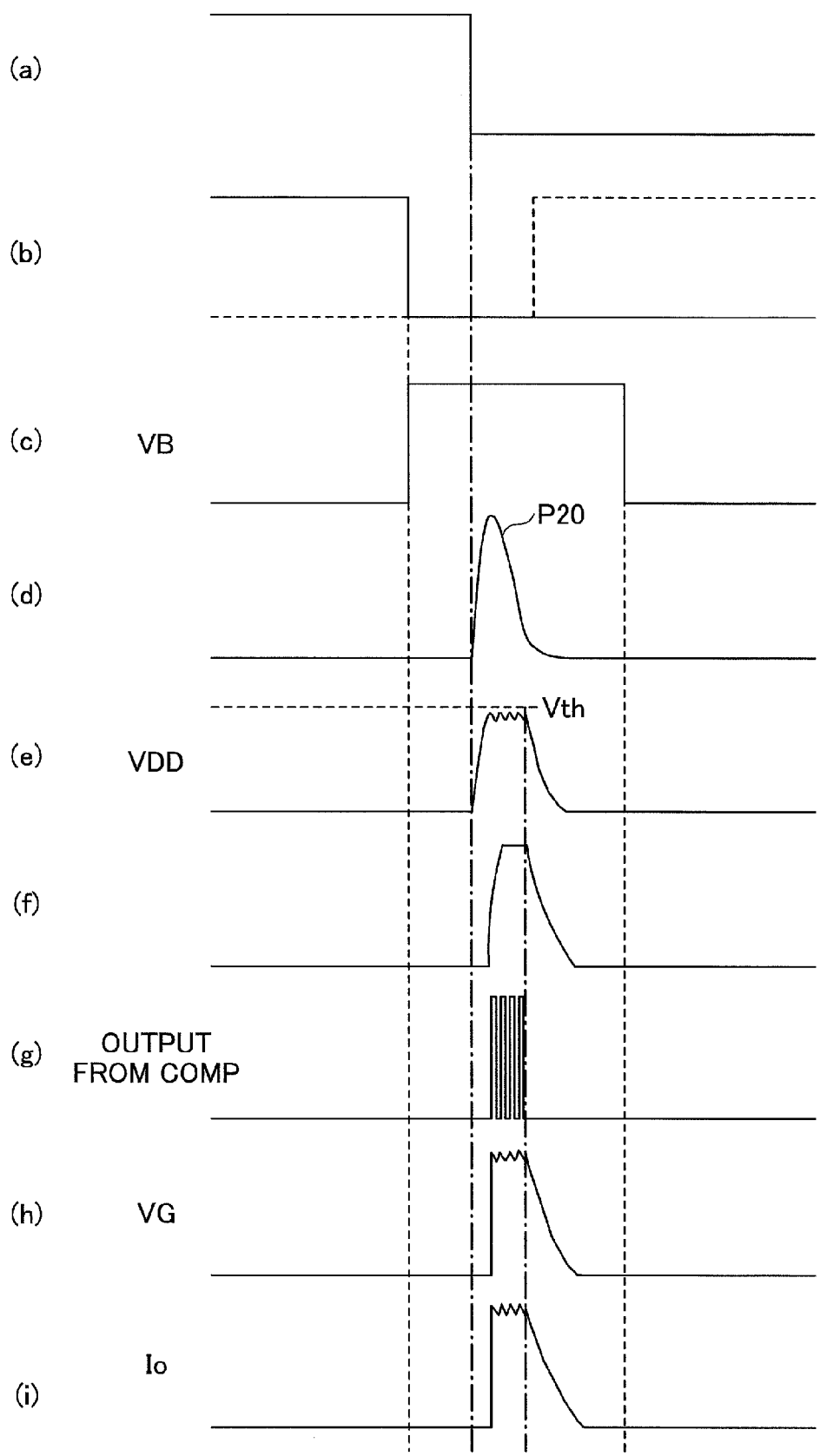
FIG. 4 illustrates signal waveforms in another part of the motor driver apparatus.

With this, the voltage VDD of the power terminal is limited to be less than the withstand voltage Vth as illustrated in (E) OF FIG. 4. Further, the output voltage from the differential amplifier 41 becomes as illustrated in FIG. 4F and the gate voltage VG of the MOS transistor M5 has a waveform illustrated in (H) OF FIG. 4, which is obtained by synthesizing waveforms illustrated in FIGS. 4F and 4G. Therefore, the MOS transistor M5 causes the source current Io having the waveform illustrated in (I) OF FIG. 4 so as to flatten the voltage VDD of the power terminal having VDD.

As described, by providing the first control part 40 and the second control part 50 inside the motor driver apparatus 30 formed of the semiconductor integrated circuit, it becomes possible to reduce externally attached parts such as the zener diodes ZD1 and ZD2 and the decoupling capacitor C2, which are required in the exemplary motor driver apparatus.

Within the above embodiment, a signal where the time period indicated by the high level signal from the inverter 47 while the direct-current motor 23 generates the back electromotive force is supplied to the control terminal of the comparator 51. Thus, the comparator 51 may be operated during only the back electromotive force generation period while the output from the inverter 47 is in the high level.

Second Embodiment

Figure 5:
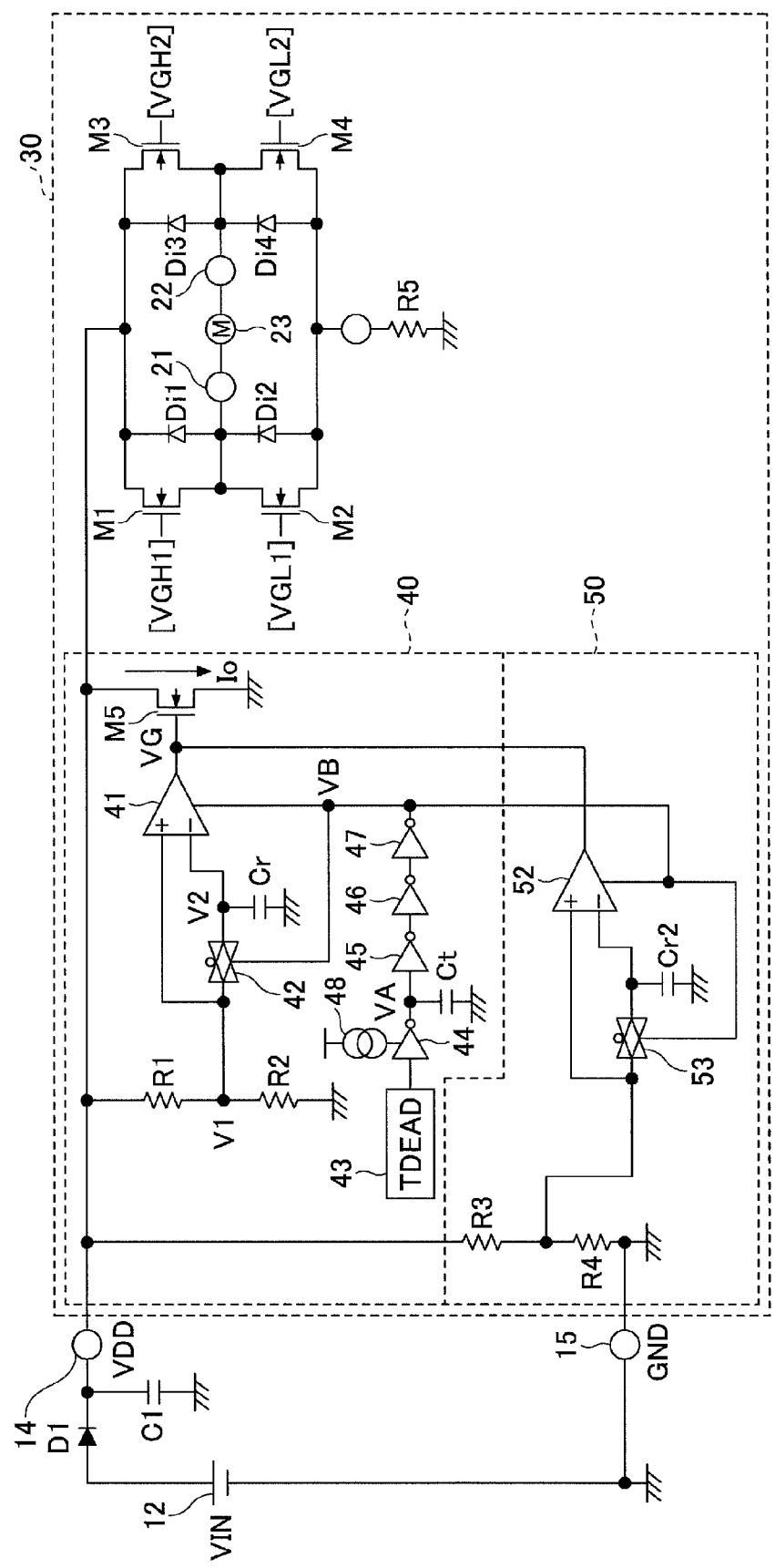
FIG. 5 illustrates a structure of a motor driver apparatus of a second embodiment of the present invention.

FIG. 5 illustrates a structure of a motor driver apparatus of a second embodiment of the present invention. Referring to FIG. 5, the same reference symbols as those in FIG. 1 are attached to the same parts. Within the second embodiment, the structure of the second control part 50 is different from that in FIG. 1.

The entire motor driver apparatus 30 is formed of a semiconductor integrated circuit. The motor driver apparatus 30 itself is the motor driver IC. The motor driver apparatus 30 is mounted on an electric instrument (not illustrated) when it is used. The positive terminal of the direct-current power source 12 inside the electric instrument is connected with a terminal 14 through a diode for protecting against a reverse connection, and the negative terminal of the direct-current power source 12 inside the electric instrument is connected with a terminal 15. Further, the terminal 14 is grounded through a bypass capacitor C1 for absorbing a voltage variation.

A power terminal having VDD and a ground terminal having GND of the motor driver apparatus 30 are connected with the terminals 14 and 15, respectively. The motor driver apparatus 30 causes an electric current to flow through the winding wire of the direct-current motor 23 whose both terminals are connected with the terminals 21 and 22 through n-channel MOS transistors M1 to M4 thereby driving to rotate the direct current motor 23.

The first state where the MOS transistors M1 and M4 are turned on and the MOS transistors M2 and M3 are turned off to cause the current to flow through the direct-current motor 23 in the direction from the terminal 21 to the terminal 22 and the second state where the MOS transistors M2 and M3 are turned on and the MOS transistors M1 and M4 are turned off to cause the current to flow through the direct-current motor 23 in the direction from the terminal 22 to the terminal 21 are alternately switched over to rotate the direct-current motor 23.

In order to obtain the above-described switch timing, a detection element (not illustrated) having a rotational phase such as a hall element is used. Drive signals VGH1 and VGL2 supplied to the gates of MOS transistors M1 and M4 and drive signals VGL1 and VGH2 supplied to the gates of MOS transistors M2 and M3 are generated using a detection signal from the detection element. A back gate of each of the MOS transistors M1, M2, M3, and M4 is connected with a source of each of the MOS transistors M1, M2, M3, and M4. Body diodes (parasitic diodes) Di1, Di2, Di3, and Di4 are formed between the sources and the drains, through which currents generated by a back electromotive force are supplied to the power terminal having VDD. Drains of the MOS transistors M1 and M3 are connected with the power terminal having VDD (the terminal 14), and sources of the MOS transistors M2 and M4 are connected with the ground directly or through a resistor R5.

(First Control Part)

The motor driver apparatus 30 includes a first control part 40 and a second control part 50 in addition to the MOS transistors M1 to M4 in a bridge structure. The first control part 40 includes resistors R1 and R2 that are connected between the power terminal VDD and the ground in series, a differential amplifier 41 whose noninverted input terminal is connected with the connection point between the resistors R1 and R2, an analog switch 42 connected between the connection point between the resistors R1 and R2 and an inverted input terminal of the differential amplifier 41, a capacitor Cr provided between the inverted input terminal of the differential amplifier 41 and the ground, four-stage inverters 44-47 supplied with a signal TDEAD from a terminal 43 and delaying the signal, a waveform shaping part formed by the inverters 44-47, a current source 48 and a capacitor Ct, and a MOS transistor M5.

The current source 48 and the capacitor Ct delay the rise of the output of the inverter 44 to make the output waveform from the inverter 47 delay the fall of the signal TDEAD. With this, the output waveform from the inverter 47 is a signal where the back electromotive force generation period while the direct-current motor 23 generates the back electromotive force is indicated by the high level. The signal is supplied to control terminals of the differential amplifier 41 and the analog switch 42 and further control terminals of the comparator 52 and the analog switch 53.

The analog switch 42 is turned on when the output signal from the inverter 47 is in the low level to make the capacitor Cr hold a divided voltage obtained by dividing the voltage VDD of the power terminal using the resistors R1 and R2. The analog switch 42 is turned off when the output signal from the inverter 47 is in the high level to apply the divided voltage held in the capacitor Cr to an inverted input terminal of the differential amplifier 41.

The differential amplifier 41 performs differential amplification when the output signal from the inverter 47 is in the high level. At the time when the motor phase switch signal rises and falls, the inductor of the wiring wire of the direct-current motor 23 generates the back electromotive force. Therefore, in the voltage VDD of the power terminal, variations are generated by the back electromotive force. In a period of time while the output waveform from the inverter 47 is in the low level, because the divided voltage of the voltage VDD of the power terminal is held in the capacitor Cr, the differential amplifier 41 outputs a voltage waveform similar to that of the variation caused by the back electromotive force. The output from the differential amplifier 41 is supplied to the gate of the n-channel MOS transistor M5. The source of the MOS transistor M5 is grounded, and the drain is connected to the power terminal having VDD. With this, the MOS transistor M5 absorbs the variations of the voltage VDD by causing a source current Io when the variations of the voltage VDD occur. Thus, the voltage VDD of the power terminal having VDD is flattened.

(Second Control Part)

The second control part 50 includes resistors R3 and R4 connected in series between the power terminal having VDD and the ground, a comparator 52 whose noninverted input terminal is connected with the connection point between the resistors R3 and R4, an analog switch 53 connected between the connection point between the resistors R3 and R4 an inverted input terminal of the comparator 52, and a capacitor Cr2 provided between the inverted input terminal and the ground.

The analog switch 53 is turned on when the output signal from the inverter 47 is in the low level to make the capacitor Cr2 hold a divided voltage obtained by dividing the voltage VDD of the power terminal using the resistors R3 and R4. The analog switch is turned off when the output signal from the inverter 47 is in the high level to apply the divided voltage held in the capacitor Cr2 to an inverted input terminal of the comparator 52.

The comparator 52 compares the divided voltage of the voltage VDD of the power terminal with the voltage held by the capacitor Cr2 when the output signal from the inverter 47 is in the high level. In a case where the divided voltage of the voltage VDD of the power terminal is high, the detection signal of the high level is generated and supplied to the gate of the having VDD. The MOS transistor M5 is turned on during the period of time while the detection signal is supplied from the comparator 52 to lower the voltage VDD of the power terminal.

Because the comparator 52 has a very great gain in comparison with the differential amplifier 41, the comparator 52 performs a high speed operation whose speed is higher than the speed of the differential amplifier 41. Therefore, the peak value of the voltage variation of the voltage VDD of the power terminal becomes high. Then, even in a case where the differential amplifier 41 cannot follow the peak value of the voltage variation of the voltage VDD of the power terminal and the voltage variation cannot absorbed using the differential amplifier 41, the comparator 52 can follow at a high speed to turn on the MOS transistor M5 to reduce the voltage VDD of the power terminal having VDD.

According to the embodiments of the present invention, it is possible to reduce the number of parts externally attached to the semiconductor integrated circuit.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the motor driver apparatus has been described in detail, it should be understood that various changes, substitutions, and alterations could be made hereto without departing from the spirit and scope of the invention.

What is claimed is:

1. A motor driver apparatus that is formed of a semiconductor integrated circuit which is supplied with an electric power and drives a direct current motor, the motor driver apparatus comprising:
   a signal generating part that generates an indication signal for indicating a back electromotive force generation period while the direct current motor generates a back electromotive force;
   a removing part that detects a voltage variation generated in a power-supply voltage by the back electromotive force generated by the direct-current motor during the back electromotive force generation period indicated by the indication signal, and removes the detected voltage variation; and
   a limiting part that limits the power-supply voltage so as to be less than a predetermined voltage at a speed higher than that in the removing part.

2. The motor driver apparatus according to claim 1,
   wherein the removing part detects the voltage variation generated by performing a differential amplification between the power-supply voltage held in a period other than the back electromotive force generation period indicated by the indication signal and the power-supply voltage in the back electromotive force generation period indicated by the indication signal,
   wherein the limiting part limits the power-supply voltage in response to a comparative result obtained by comparing the power-supply voltage with the predetermined voltage.

3. The motor driver apparatus according to claim 2,
   wherein the limiting part limits the power-supply voltage in response to the comparative result obtained by comparing the power-supply voltage in the back electromotive force generation period indicated by the indication signal with the predetermined voltage.

4. The motor driver apparatus according to claim 1,
   wherein the removing part detects the voltage variation generated in the power-supply voltage by performing a differential amplification between the power-supply voltage held in a period other than the back electromotive force generation period indicated by the indication signal and the power-supply voltage in the back electromotive force generation period indicated by the indication signal,
   wherein the limiting part limits the power-supply voltage in response to a comparative result obtained by comparing the power-supply voltage held in the period other than the back electromotive force generation period indicated by the indication signal with the power-supply voltage in the back electromotive force generation period indicated by the indication signal.

5. A method of controlling a motor driver apparatus that is formed of a semiconductor integrated circuit which is supplied with an electric power and drives a direct current motor, the method comprising:
- generating an indication signal for indicating a back electromotive force generation period while the direct current motor generates a back electromotive force;
- detecting a voltage variation generated in a power-supply voltage by the back electromotive force generated by the direct-current motor during the back electromotive force generation period indicated by the indication signal;
- removing the detected voltage variation; and
- limiting the power-supply voltage so as to be less than a predetermined voltage at a speed higher than that in the removing the detected voltage variation.

6. The method of controlling the motor driver apparatus according to claim 5,
- wherein the detecting the voltage variation includes performing a differential amplification between the power-supply voltage held in a period other than the back electromotive force generation period indicated by the indication signal and the power-supply voltage in the back electromotive force generation period indicated by the indication signal,
- wherein the limiting the power-supply voltage is performed in response to a comparative result obtained by comparing the power-supply voltage with the predetermined voltage.

7. The method of controlling the motor driver apparatus according to claim 6,
- wherein the limiting the power-supply voltage is performed in response to the comparative result obtained by comparing the power-supply voltage in the back electromotive force generation period indicated by the indication signal with the predetermined voltage.

8. The method of controlling the motor driver apparatus according to claim 5,
- wherein the detecting the voltage variation includes performing a differential amplification between the power-supply voltage held in a period other than the back electromotive force generation period indicated by the indication signal and the power-supply voltage in the back electromotive force generation period indicated by the indication signal,
- wherein the limiting the power-supply voltage is performed in response to a comparative result obtained by comparing the power-supply voltage held in the period other than the back electromotive force generation period indicated by the indication signal with the power-supply voltage in the back electromotive force generation period indicated by the indication signal.

* * * * *